United States Patent [19]

Caputo

[11] Patent Number: 4,831,970
[45] Date of Patent: May 23, 1989

[54] DEVICE FOR THE INJECTION IN INTERNAL COMBUSTION ENGINES OF COMBUSTIBLE EMULSIONS WITH A READILY VARIABLE EMULSION RATIO

[75] Inventor: Carmelo Caputo, Rome, Italy

[73] Assignee: Agip Pitroli, S.p.A., Rome, Italy

[21] Appl. No.: 158,768

[22] Filed: Feb. 22, 1988

[30] Foreign Application Priority Data

Mar. 3, 1987 [IT] Italy .................................. 19549 A/87

[51] Int. Cl.⁴ ............................................. F02D 19/00
[52] U.S. Cl. .................................. 123/25 A; 123/575
[58] Field of Search ................ 123/27 GE, 304, 25 E, 123/25 D, 25 C, 575

[56] References Cited

U.S. PATENT DOCUMENTS

| | | | |
|---|---|---|---|
| 4,388,893 | 6/1983 | Apfel | 123/25 J |
| 4,416,225 | 11/1983 | Constantine et al. | 123/25 C |
| 4,438,731 | 3/1984 | Maggio | 123/25 N |
| 4,481,921 | 11/1984 | Tsukahara | 123/304 |

OTHER PUBLICATIONS

Patent Abstract of Japan, vol. 7, No. 133 (Toyota Jidosha Kogyo K.K.).
M.T.Z. Motortechnische Zeitschrift, vol. 44, No. 11, W. Dietrich et al.

*Primary Examiner*—E. Rollins Cross
*Attorney, Agent, or Firm*—Hedman, Gibson, Costigan & Hoare

[57] ABSTRACT

Device for the injection in internal combustion engines of combustible emulsions with a readily variable ratio, constituted by a hydrocarbon phase and a component poorly miscible with it, which comprises a positive-displacement pump driven by a portion of the delivery of the injection pump fed with the hydrocarbon phase, said positive-displacement pump carrying out the pumping of the other component of the emulsion; the two components of the emulsion are combined in the injector, which incorporates a static emulsifying device upstream the same injector.

6 Claims, 1 Drawing Sheet

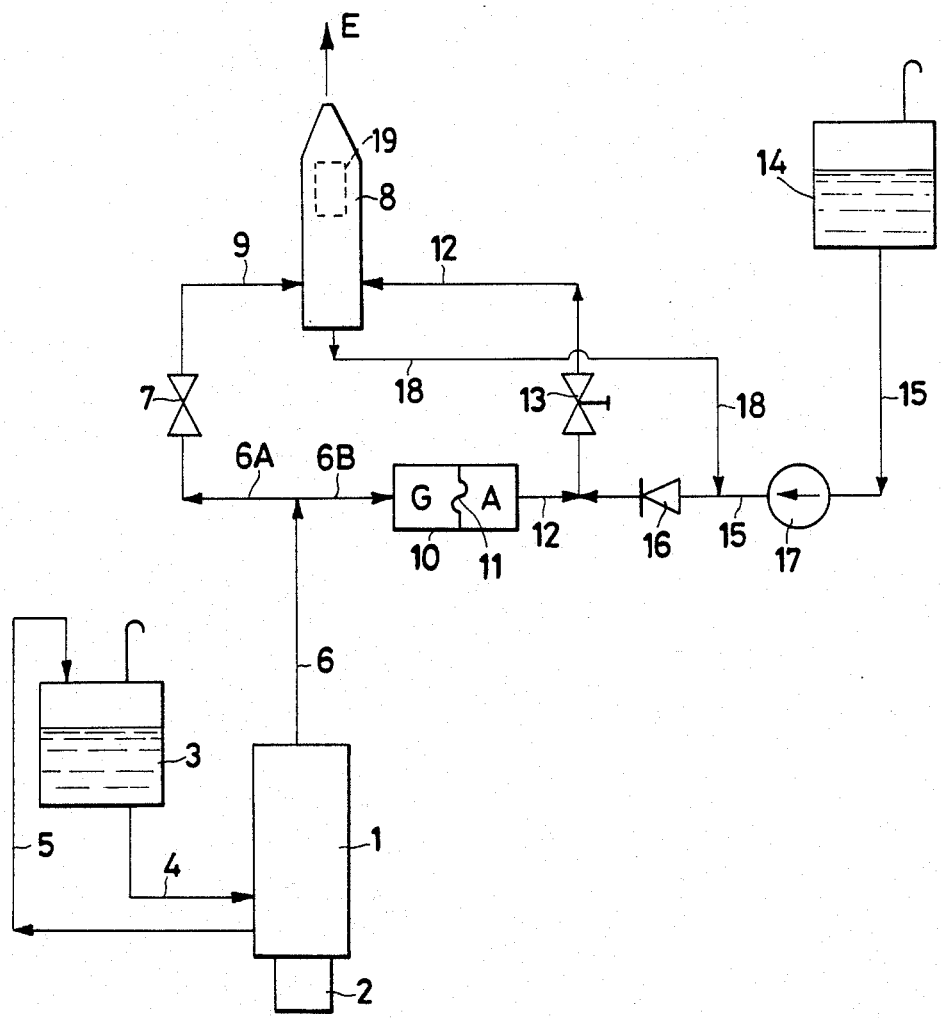

DEVICE FOR THE INJECTION IN INTERNAL COMBUSTION ENGINES OF COMBUSTIBLE EMULSIONS WITH A READILY VARIABLE EMULSION RATIO

BACKGROUND OF THE INVENTION

The present invention relates to a device for the injection of combustible emulsions in internal combustion engines, with a readily variable ratio between the emulsion components.

From the art, the advantages are known, which derive from feeding the internal combustion engines with fuels constituted by emulsion combustible mixtures. Said emulsions are generally constituted by the hydrocarbon fuel, whether gasoline for the spark-plug-ignited engines, or gas oil for compression-ignition engines, and a polar compound poorly miscible with it, such as, e.g., water or methanol.

Said polar compounds show very advantageous effects from an economic, energetic and environmental viewpoint, and make it possible to improve the combustion, to keep clean and efficient the engine, and to reduce the polluting emissions.

For the purpose of fully exploiting such advantageous effects of the emulsion feeding, and limiting the disadvantages thereof, it is however necessary that the possibility be supplied of readily varying the ratio between the emulsion components, as a function of the revolution speed and of the load under which an internal combustion engine must usually operate, wherein such operating parameters, e.g., in the customary use on road vehicles, can vary within very wide limits.

SUMMARY OF THE INVENTION

The present invention relates hence more particularly to the solution of the technical problem of the ready and efficacious regulation of the ratio between the hydrocarbon component and the polar component. It is disclosed hereunder with reference to a compression-ignited engine—commonly denominated "Diesel engine" and to the gas oil/water emulsions, with the necessary warning that the invention is not limited to such a type of practical embodiment.

Referring to the use in the Diesel engines, it is known that the adoption of a fuel constituted by a gas oil/water emulsion—as long as such emulsion is endowed with the necessary characteristics of fineness and uniformity—allows the smokiness and the amount of nitrogen oxides present in the exhaust gases to be very considerably reduced. That means a better combustion, and a higher efficiency of the engine, which remains clean and more efficient.

That involves also the non-secondary advantage that the noxious and troublesome emissions are limited, in particular in town traffic.

According to the prior art, such emulsions are generally prepared by an emulsifying device provided upstream the injection pump, viz., in the low-pressure branch of the engine feed system.

The injection pump and the whole high-pressure branch of the fuel feed circuit are hence fed with the emulsion previously prepared upstream said injection pump.

This type of technical solution engages with the emulsion the whole high-pressure branch of the fuel feed system, the ducts and the same injectors, which, in their whole, have a very large volume, as compared with the volume generated by a stroke of the reciprocating injection pump.

As a consequence thereof, it is evident that the effect of changing the "emulsion ratio", viz., the water/fuel weight ratio, takes place after the time necessary for consuming all the emulsion already contained in the volume of the high-pressure branch of the feed system.

As relates to the use on road vehicles—in particular in town traffic—such a delay, by being of the order of magnitude of one minute, is regarded as being too long and unacceptable.

The reduction of the above said "noxious volume" is feasible only within such limits as imposed by the geometry of the engine, and does not make it possible to substantially reduce the above mentioned time. For exemplifying purposes, it is enough to consider, e.g., that the engine—when the vehicle is not running should idle and be fed with gas oil only, in particular in case of long stops, and that on the contrary, when starting out again, when it must run under a high load, it should preferably be fed with an emulsion containing the provided highest water level (approximately 15-25% by weight).

A further drawback is due to the fact that the water/gas oil emulsions can show problems of unstability over time.

BRIEF DESCRIPTION OF THE DRAWINGS

The present invention makes it possible, on the contrary, to feed the engine with water/gas oil emulsions having a readily variable emulsion ratio.

It consists in a device positioned downstream the injection pump, and preferably immediately before each injector. Such a device is disclosed by referring to FIG. 1, which shows a diagram of a practical embodiment if the invention, as applied to Diesel engines.

DESCRIPTION OF THE PREFERRED EMBODIMENTS

The injection pump 1 is driven by the mechanical drive means 2 and is fed with the gas oil from tank 3, with which it is connected by the feed line 4 and the return duct 5. The delivery of the pump 1 is sent to the fuel feed by means of the duct 6, which divides into two branches 6A and 6B.

The duct 6A, throttled by the valve 7, feeds the injector 8 through the duct 9. The other branch 6B delivers the residual amount of fuel to a transfer device 10. The transfer device 10—which constitutes an important component of the device according to the invention—is constituted by a closed vessel containing a moving separation member 11.

Such separation member subdivides the volume comprised inside the vessel into two separate volumes, inside which the same pressure exists.

It can be constituted by a flexible and elastic membrane, or by a bellows or a moving piston, or the like.

The separation member 11, in the form of membranes or of bellows, can be made from flexible materials, such as natural or synthetic polymers chemically resistant to the components of the emulsion, metal foils, composite materials and the like; it must be properly supported and constrained inside the transfer device 10, but does not pose any constraints as to its shape.

In case, on the contrary, that the separation member 11 is accomplished as a piston, the inner shape of the vessel is constrained to accurately match with the cross section of the piston sliding inside it. Such piston can be made from rigid materials, such as metals, ceramic or rigid polymeric materials, such as fluorocarbons.

The preferred shape is the cylindrical one, with its contact surface being precision-ground.

The volume G adjacent to duct 6B is occupied by the gas oil, the other volume A is occupied, on the contrary, by the water to be emulsified into the gas oil.

It appears evident that, at each delivery stroke of the pump 1, the gas oil transmits its pressure inside the transfer device 10, to volume A; as a consequence, water contained inside volume A—due to the effect of the shift of the separation member 11, and in an amount corresponding to the volume displaced by it—is delivered, by means of duct 12, throttled by the control valve 13, to the injector 8.

On the contrary, at each return, or intake, stroke of pump 1, inside the transfer device 10, on G side, a suction is generated, which shifts towards the opposite direction the separation member 11 and draws water from the tank 14, through the line 15, and the nonreturn valve 16. If necessary in the line 15 an auxiliary water-feed pump 17 can be interposed, which supplies to the transfer device 10 a slight overpressure, which disengages the tank 14 from obliged positions.

The injectors 8 of the engine must be provided with a mixing duct, and an emulsifier device 19 inside their interior. Such injectors can be accomplished by incorporating inside them, e.g., a static, jet-diffraction emulsifying device—which, thanks to its small dimensions, is particularly suitable for the intended purpose—upstream a normal-design injector.

The water-gas oil mixing duct upstream the emulsifying device can be indifferently positioned inside or outside the injector 8, which will respectively have, in the two cases, separate inlet ports 9 and 12 for gas oil and water, or one inlet port only, for the mixture.

The return from the injector 8 is conveyed through the duct 18 to the water feed pipe 15 upstream the nonreturn valve 16.

Summarizing, the function of the device consists in feeding the injector 8—which incorporates the static emulsifying device—with gas oil and water in their desired proportions: the first is directly delivered by the injection pump 1, and the second is pushed, on the contrary, by a portion of gas oil, which drives the transfer device 10 so to make it act as a positive-displacement pump.

The relative amounts of gas oil and water are regulated, at each pump delivery stroke, by the valves 7 and 13.

Either of said two valves—e.g., valve 7 in Figure—is adjusted in its position once for all, and has the purpose of generating a localized pressure drop inside the duct 6A, for securing the inflow into the volume G of the transfer device 10. In that case, the valve 7 can be replaced, e.g., by a calibrated nozzle, so calibrated for the purpose of maintaining said desired pressure drop. The regulation is entrusted to the other valve.

Still referring to the example shown in Figure the other valve 13 is, on the contrary, modulated; its operation regulates—by throttling the outflow into the duct 12—the emulsion ratio, viz., the gas oil/water weight ratio.

It results evident that the regulation roles can be inverted between the two valves, and that the only valve which is really necessary is the regulation valve.

The time of regulation of such ratio in outflow E results shorter than 1 second, and can reach values as short as 50–80 msec.

I claim:

1. A device for injecting into an internal combustion engine a combustible emulsion of a readily variable ratio of hydrocarbon fuel and of a fluid poorly miscible with the hydrocarbon fuel, said device comprising:
   (a) an injection pump for delivering a stream of hydrocarbon fuel, having a delivery stroke and an intake stroke;
   (b) drive means coupled to said injection pump for driving said injection pump;
   (c) branching means connected to said injection pump for subdividing said stream of hydrocarbon fuel into a first and a second substream;
   (d) an injector device connected to said branching means that receives said first substream of hydrocarbon fuel;
   (e) an emulsifier device operatively coupled to said injector device;
   (f) a hollow transfer device connected to said branching means having a moveable separation member subdividing the interior of said transfer device into a first and second chamber, said first chamber adapted to contain said second substream of hydrocarbon fuel delivered via said branching means and said second chamber adapted to contain the poorly miscible fluid delivered by a first poorly miscible fluid delivery means;
   (g) a second poorly miscible fluid delivery means having two ends, connected at one end to said second chamber and connected at the other end to said injector device such that at the delivery stroke of said injection pump, said first substream of hydrocarbon fuel is sent to said injector device via said branching means and said second substream of hydrocarbon fuel is sent to said first chamber of said transfer device via said branching means wherein the pressure of the hydrocarbon fuel shifts said separation member towards said second chamber by a certain volume, whereby the corresponding displaced volume of the poorly miscible fluid is sent via said second poorly miscible fluid delivery means to said injector device and such that at the intake stroke of said injection pump, a suction is generated within said first chamber of said transfer device which shifts said separation member towards said first chamber, thus drawing the poorly miscible fluid from said first poorly miscible fluid delivery means into said second chamber; and
   (h) pair of first and second valve means, said first valve means coupled to said branching means and said second valve means coupled to said second poorly miscible fluid delivery means, said pair of valve means controlling the ratio of hydrocarbon fuel to poorly miscible fluid.

2. A device according to claim 1, wherein said movable separation member is a membrane.

3. A device according to claim 1, wherein said internal combustion engine is a compression-ignited engine and wherein the hydrocarbon fuel is gas oil and the poorly miscible fluid is water.

4. A device according to claim 1, wherein said first valve means is a regulation valve which modulates the weight ratio of the hydrocarbon fuel to the poorly miscible fluid and said second valve means maintains a constant localized pressure drop.

5. A device according to claim 1, wherein said second valve means is a regulation valve which modulates the weight ratio of the hydrocarbon fuel to the poorly miscible fluid and said first valve means maintains a constant localized pressure drop.

6. A device according to anyone of the preceding claims further comprising a nonreturn valve incorporated into said first poorly miscible fluid delivery means.

* * * * *

UNITED STATES PATENT AND TRADEMARK OFFICE
CERTIFICATE OF CORRECTION

PATENT NO. : 4,831,970
DATED : May 23, 1989
INVENTOR(S) : Carmelo Caputo

It is certified that error appears in the above-identified patent and that said Letters Patent is hereby corrected as shown below:

ON TITLE PAGE: Assignee "Agip Pitroli" should read as

-- Agip Petroli --.

Signed and Sealed this

Thirty-first Day of March, 1992

Attest:

HARRY F. MANBECK, JR.

*Attesting Officer*     *Commissioner of Patents and Trademarks*